(12) United States Patent
Gehrke et al.

(10) Patent No.: US 8,525,681 B2
(45) Date of Patent: Sep. 3, 2013

(54) LOCATION BASED PROXIMITY ALERT

(75) Inventors: Todd Gehrke, Seattle, WA (US); Chih Wang, Shoreline, WA (US); Farhad Kasad, Bothell, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 699 days.

(21) Appl. No.: 12/588,330

(22) Filed: Oct. 13, 2009

(65) Prior Publication Data

US 2010/0090827 A1 Apr. 15, 2010

Related U.S. Application Data

(60) Provisional application No. 61/136,918, filed on Oct. 14, 2008.

(51) Int. Cl.
*G08B 23/00* (2006.01)

(52) U.S. Cl.
USPC ............... 340/573.4; 340/539.13; 455/456.1

(58) Field of Classification Search
USPC ............... 340/573.1, 573.4, 539.11, 539.13, 340/539.23, 686.6; 455/456.1
See application file for complete search history.

(56) References Cited

U.S. PATENT DOCUMENTS

| | | | |
|---|---|---|---|
| 4,445,118 A | 4/1984 | Taylor |
| 4,928,107 A | 5/1990 | Kuroda |
| 4,972,484 A | 11/1990 | Theile |
| 5,126,722 A | 6/1992 | Kamis |
| 5,283,570 A | 2/1994 | DeLuca |
| 5,301,354 A | 4/1994 | Schwendeman |
| 5,311,516 A | 5/1994 | Kuznicki |
| 5,327,529 A | 7/1994 | Fults |
| 5,335,246 A | 8/1994 | Yokev |
| 5,351,235 A | 9/1994 | Lahtinen |
| 5,365,451 A | 11/1994 | Wang |
| 5,418,537 A | 5/1995 | Bird |
| 5,422,813 A | 6/1995 | Schuchman |
| 5,479,408 A | 12/1995 | Will |
| 5,485,163 A | 1/1996 | Singer |
| 5,504,491 A | 4/1996 | Chapman |
| 5,506,886 A | 4/1996 | Maine |
| 5,517,199 A | 5/1996 | DiMattei |
| 5,530,655 A | 6/1996 | Lokhoff |
| 5,530,914 A | 6/1996 | McPheters |
| 5,539,395 A | 7/1996 | Buss |
| 5,539,829 A | 7/1996 | Lokhoff |
| 5,546,445 A | 8/1996 | Dennison |
| 5,568,153 A | 10/1996 | Beliveau |
| 5,583,774 A | 12/1996 | Diesel |
| 5,594,780 A | 1/1997 | Wiedeman |
| 5,606,618 A | 2/1997 | Lokhoff |

(Continued)

OTHER PUBLICATIONS

International Search Report received in PCT/US2011/00671 dated Apr. 25, 2012.

(Continued)

*Primary Examiner* — Thomas Mullen
(74) *Attorney, Agent, or Firm* — William H. Bollman

(57) ABSTRACT

A method of location based proximity alert retrieves, from a location based proximity alert physical server, a current location of wireless client devices and determines if it is within a given area. The method accesses, from the location based proximity alert physical server, a physical law enforcement database comprising a restraining order target identifier and a restraining order limit identifier. A geo-proximity alert message is transmitted if the current location of the restraining order target identifier matches the restraining order limit identifier.

13 Claims, 3 Drawing Sheets

(56) References Cited

U.S. PATENT DOCUMENTS

| | | |
|---|---|---|
| 5,629,693 A | 5/1997 | Janky |
| 5,633,630 A | 5/1997 | Park |
| 5,636,276 A | 6/1997 | Brugger |
| 5,661,652 A | 8/1997 | Sprague |
| 5,661,755 A | 8/1997 | Van de Kerkhof |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,727,057 A | 3/1998 | Emery |
| 5,731,785 A | 3/1998 | Lemelson |
| 5,765,152 A | 6/1998 | Erickson |
| 5,771,353 A | 6/1998 | Eggleston |
| 5,774,670 A | 6/1998 | Montulli |
| 5,809,415 A | 9/1998 | Rossmann |
| 5,812,086 A | 9/1998 | Bertiger |
| 5,812,087 A | 9/1998 | Krasner |
| 5,841,396 A | 11/1998 | Krasner |
| 5,857,201 A | 1/1999 | Wright, Jr. |
| 5,864,667 A | 1/1999 | Barkan |
| 5,874,914 A | 2/1999 | Krasner |
| 5,896,369 A | 4/1999 | Warsta |
| 5,898,391 A | 4/1999 | Jefferies |
| 5,922,074 A | 7/1999 | Richard |
| 5,930,250 A | 7/1999 | Klok |
| 5,945,944 A | 8/1999 | Krasner |
| 5,946,629 A | 8/1999 | Sawyer |
| 5,950,137 A | 9/1999 | Kim |
| 5,960,362 A | 9/1999 | Grob |
| 5,983,099 A | 11/1999 | Yao |
| 5,999,124 A | 12/1999 | Sheynblat |
| 6,032,051 A | 2/2000 | Hall |
| 6,049,718 A | 4/2000 | Stewart |
| 6,052,081 A | 4/2000 | Krasner |
| 6,058,338 A | 5/2000 | Agashe |
| 6,061,018 A | 5/2000 | Sheynblat |
| 6,064,336 A | 5/2000 | Krasner |
| 6,067,045 A | 5/2000 | Castelloe |
| 6,081,229 A | 6/2000 | Soliman |
| 6,085,320 A | 7/2000 | Kaliski, Jr. |
| 6,118,403 A | 9/2000 | Lang |
| 6,121,923 A | 9/2000 | King |
| 6,124,810 A | 9/2000 | Segal |
| 6,131,067 A | 10/2000 | Girerd |
| 6,133,874 A | 10/2000 | Krasner |
| 6,134,483 A | 10/2000 | Vayanos |
| 6,147,598 A | 11/2000 | Murphy |
| 6,150,980 A | 11/2000 | Krasner |
| 6,154,172 A | 11/2000 | Piccionelli |
| 6,169,901 B1 | 1/2001 | Boucher |
| 6,169,902 B1 | 1/2001 | Kawamoto |
| 6,178,506 B1 | 1/2001 | Quick, Jr. |
| 6,185,427 B1 | 2/2001 | Krasner |
| 6,188,354 B1 | 2/2001 | Soliman |
| 6,188,909 B1 | 2/2001 | Alanara |
| 6,189,098 B1 | 2/2001 | Kaliski, Jr. |
| 6,195,557 B1 | 2/2001 | Havinis |
| 6,204,798 B1 | 3/2001 | Fleming |
| 6,205,330 B1 | 3/2001 | Winbladh |
| 6,208,290 B1 | 3/2001 | Krasner |
| 6,215,441 B1 | 4/2001 | Moeglein |
| 6,239,742 B1 | 5/2001 | Krasner |
| 6,247,135 B1 | 6/2001 | Feague |
| 6,249,873 B1 | 6/2001 | Richard |
| 6,253,203 B1 | 6/2001 | O'Flaherty |
| 6,260,147 B1 | 7/2001 | Quick, Jr. |
| 6,275,692 B1 | 8/2001 | Skog |
| 6,275,849 B1 | 8/2001 | Ludwig |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,321,257 B1 | 11/2001 | Kotola |
| 6,324,524 B1 | 11/2001 | Lent |
| 6,327,473 B1 | 12/2001 | Soliman |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,430,504 B1 | 8/2002 | Gilbert |
| 6,433,734 B1 | 8/2002 | Krasner |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,525,687 B2 | 2/2003 | Roy |
| 6,525,688 B2 | 2/2003 | Chou |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | Fomukong |
| 6,560,534 B2 | 5/2003 | Abraham |
| 6,567,035 B1 | 5/2003 | Elliott |
| 6,570,530 B2 | 5/2003 | Gaal |
| 6,574,558 B2 | 6/2003 | Kohli |
| 6,580,390 B1 | 6/2003 | Hay |
| 6,584,552 B1 | 6/2003 | Kuno et al. |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt et al. |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |

| Patent No. | Date | Name |
|---|---|---|
| 6,724,342 B2 | 4/2004 | Bloebaum |
| 6,725,159 B2 | 4/2004 | Krasner |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronomeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,050 B1 | 9/2004 | Krasner |
| 6,801,124 B2 | 10/2004 | Naitou |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,560 B2 | 11/2004 | van Diggelen |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong |
| 6,820,069 B1 | 11/2004 | Kogan |
| 6,829,475 B1 | 12/2004 | Lee |
| 6,832,373 B2 | 12/2004 | O'Neill |
| 6,833,785 B2 | 12/2004 | Brown |
| 6,839,020 B2 | 1/2005 | Geier |
| 6,839,021 B2 | 1/2005 | Sheynblat |
| 6,842,715 B2 | 1/2005 | Gaal |
| 6,853,849 B1 | 2/2005 | Tognazzini |
| 6,853,916 B2 | 2/2005 | Fuchs |
| 6,856,282 B2 | 2/2005 | Mauro |
| 6,861,980 B1 | 3/2005 | Rowitch et al. |
| 6,865,171 B1 | 3/2005 | Nilsson |
| 6,865,395 B2 | 3/2005 | Riley |
| 6,867,734 B2 | 3/2005 | Voor et al. |
| 6,873,854 B2 | 3/2005 | Crockett et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,895,324 B2 | 5/2005 | Straub |
| 6,900,758 B1 | 5/2005 | Mann et al. |
| 6,903,684 B1 | 6/2005 | Simic et al. |
| 6,904,029 B2 | 6/2005 | Fors |
| 6,907,224 B2 | 6/2005 | Younis |
| 6,907,238 B2 | 6/2005 | Leung |
| 6,912,395 B2 | 6/2005 | Benes |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,956,467 B1 | 10/2005 | Mercado, Jr. |
| 6,957,073 B2 | 10/2005 | Bye |
| 6,961,562 B2 | 11/2005 | Ross |
| 6,965,754 B2 | 11/2005 | King |
| 6,965,767 B2 | 11/2005 | Maggenti |
| 6,970,917 B1 | 11/2005 | Kushwaha |
| 6,973,166 B1 | 12/2005 | Tsumpes |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohles |
| 6,985,105 B1 | 1/2006 | Pitt et al. |
| 6,996,720 B1 | 2/2006 | DeMello |
| 6,999,782 B2 | 2/2006 | Shaughnessy |
| 7,024,321 B1 | 4/2006 | Deniger et al. |
| 7,024,393 B1 | 4/2006 | Peinado |
| 7,047,411 B1 | 5/2006 | DeMello |
| 7,058,358 B2 | 6/2006 | Cannon |
| 7,064,656 B2 | 6/2006 | Bekcher |
| 7,065,351 B2 | 6/2006 | Carter |
| 7,065,507 B2 | 6/2006 | Mohammed |
| 7,071,814 B1 | 7/2006 | Schorman |
| 7,079,857 B2 | 7/2006 | Maggenti |
| 7,103,018 B1 | 9/2006 | Hasen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Magennti |
| 7,177,623 B2 | 2/2007 | Baldwin |
| 7,209,969 B2 | 4/2007 | Lahti |
| 7,218,940 B2 | 5/2007 | Niemenna |
| 7,221,959 B2 | 5/2007 | Lindquist |
| 7,269,413 B2 | 9/2007 | Kraft |
| 7,301,494 B2 | 11/2007 | Waters |
| 7,324,823 B1 | 1/2008 | Rosen |
| 7,372,839 B2 | 5/2008 | Relan |
| 7,739,402 B2 | 6/2010 | Roese |
| 8,190,169 B2 | 5/2012 | Shim |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0102999 A1 | 8/2002 | Maggenti |
| 2002/0112047 A1 | 8/2002 | Kushwaha |
| 2002/0135504 A1 | 9/2002 | Singer |
| 2002/0173317 A1 | 11/2002 | Nykanen |
| 2002/0198632 A1 | 12/2002 | Breed et al. |
| 2003/0009602 A1 | 1/2003 | Jacobs |
| 2003/0037163 A1 | 2/2003 | Kitada |
| 2003/0065788 A1 | 4/2003 | Salomaki |
| 2003/0078064 A1 | 4/2003 | Chan |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 | 6/2003 | Pew |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0204640 A1 | 10/2003 | Sahinaja |
| 2003/0223381 A1 | 12/2003 | Schroderus |
| 2004/0002326 A1 | 1/2004 | Maher |
| 2004/0044623 A1 | 3/2004 | Wake |
| 2004/0046667 A1 | 3/2004 | Copley |
| 2004/0064550 A1 | 4/2004 | Sakata |
| 2004/0068724 A1 | 4/2004 | Gardner |
| 2004/0090121 A1 | 5/2004 | Simonds |
| 2004/0204806 A1 | 10/2004 | Chen |
| 2004/0205151 A1 | 10/2004 | Sprigg |
| 2004/0229632 A1 | 11/2004 | Flynn |
| 2004/0257273 A1 | 12/2004 | Benco |
| 2005/0003797 A1 | 1/2005 | Baldwin |
| 2005/0028034 A1 | 2/2005 | Gantman |
| 2005/0039178 A1 | 2/2005 | Marolia |
| 2005/0041578 A1 | 2/2005 | Huotari |
| 2005/0086340 A1 | 4/2005 | Kang |
| 2005/0086467 A1 | 4/2005 | Asokan |
| 2005/0112030 A1 | 5/2005 | Gauss |
| 2005/0136895 A1 | 6/2005 | Thenthiruperai |
| 2005/0172217 A1 | 8/2005 | Leung |
| 2005/0174987 A1 | 8/2005 | Raghav |
| 2005/0209995 A1 | 9/2005 | Aksu |
| 2005/0246217 A1 | 11/2005 | Horn |
| 2005/0259675 A1 | 11/2005 | Tuohino |
| 2006/0053225 A1 | 3/2006 | Poikselka |
| 2006/0058045 A1 | 3/2006 | Nilsen |
| 2006/0058948 A1 | 3/2006 | Blass |

| | | | | | | |
|---|---|---|---|---|---|---|
| 2006/0074618 A1 | 4/2006 | Miller | | 2007/0271596 A1 | 11/2007 | Boubion |
| 2006/0090136 A1 | 4/2006 | Miller | | 2008/0026723 A1 | 1/2008 | Han |
| 2006/0097866 A1 | 5/2006 | Adamczyk et al. | | 2008/0198989 A1 | 8/2008 | Contractor |
| 2006/0212558 A1 | 9/2006 | Sahinoja | | 2008/0227467 A1 | 9/2008 | Barnes |
| 2006/0212562 A1 | 9/2006 | Kushwaha | | 2009/0058830 A1 | 3/2009 | Herz |
| 2006/0234639 A1 | 10/2006 | Kushwaha | | 2009/0204815 A1 | 8/2009 | Dennis |
| 2006/0234698 A1 | 10/2006 | Fok | | 2010/0050251 A1 | 2/2010 | Speyer |
| 2007/0026854 A1 | 2/2007 | Nath | | | | |
| 2007/0030116 A1 | 2/2007 | Feher | | | | |
| 2007/0030539 A1 | 2/2007 | Nath | | | | |
| 2007/0030973 A1 | 2/2007 | Mikan | | | | |
| 2007/0186105 A1 | 8/2007 | Bailey | | | | |

OTHER PUBLICATIONS

Search Report received in PCT/US2011/00950 dated Sep. 16, 2011.
Search Report received in PCT/US2009/05575 dated Dec. 3, 2009.
Search report received in PCT/US2009/05575 dated Jan. 14, 2011.

LOCATION BASED PROXIMITY ALERT

The present invention claims priority from U.S. Provisional Application 61/136,918, filed Oct. 14, 2008, entitled "LOCATION BASED PROXIMITY ALERT", to GEHRKE et al., the entirety of which is expressly incorporated herein by reference.

BACKGROUND OF THE INVENTION

1. Field of the Invention

This invention relates generally to wireless communications. More particularly, it relates to location based services (LBS).

2. Background

Courts routinely order restraining orders for any of a number of reasons. For example, persons can be issued a restraining order ordering them to remain a fixed distance from another person, to remain a fixed distance from schools, parks, or other establishments related to children. No matter the type of restraining order issued, there persists a problem in enforcing restraining orders.

Generally, restraining orders require persons viewing a restraining order violation to report such a violation to the police. The restraining order violator that is reported to the police is generally arrested for violating the restraining order.

In extreme cases, a tracking device, such as an ankle tracking device, can be court ordered attached to a person to electronically monitor their compliance with a restraining order. However, such electronic monitors are costly and require dedicated monitoring devices to detect a restraining order violation.

There is a need for a method and apparatus that allows for cost effective automated tracking of persons subject to a restraining order. This would eliminate human initiated reporting of a restraining order violation that is limited by a requirement for a human to view a restraining order violator and the ability of the viewer to contact the police.

SUMMARY OF THE INVENTION

In accordance with the principles of the present invention, method of providing location based proximity alert services comprises retrieving, at a location based proximity alert physical server, a current location of a wireless client device associated with a given restraining order target identifier. A law enforcement database comprising a plurality of restraining order target identifiers, each associated with a corresponding restraining order limit identifier, is accessed to obtain a relevant restraining order limit identifier associated with the given restraining order target identifier. A geo-proximity alert message is generated when the current location is within a prohibited geographic area associated with the given restraining order target identifier.

A location based proximity alert physical server in accordance with another aspect of the invention comprises a law enforcement database access module to access a physical law enforcement database comprising a plurality of restraining order target identifiers each associated with a restraining order limit identifier. A location access module retrieves, from the location based proximity alert physical server, a current location of the restraining order target. A restraining order violation module generates a geo-proximity alert message if the current location for the restraining order target enters a prohibited geographic area associated with the restraining order limit identifier.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Figure 1:
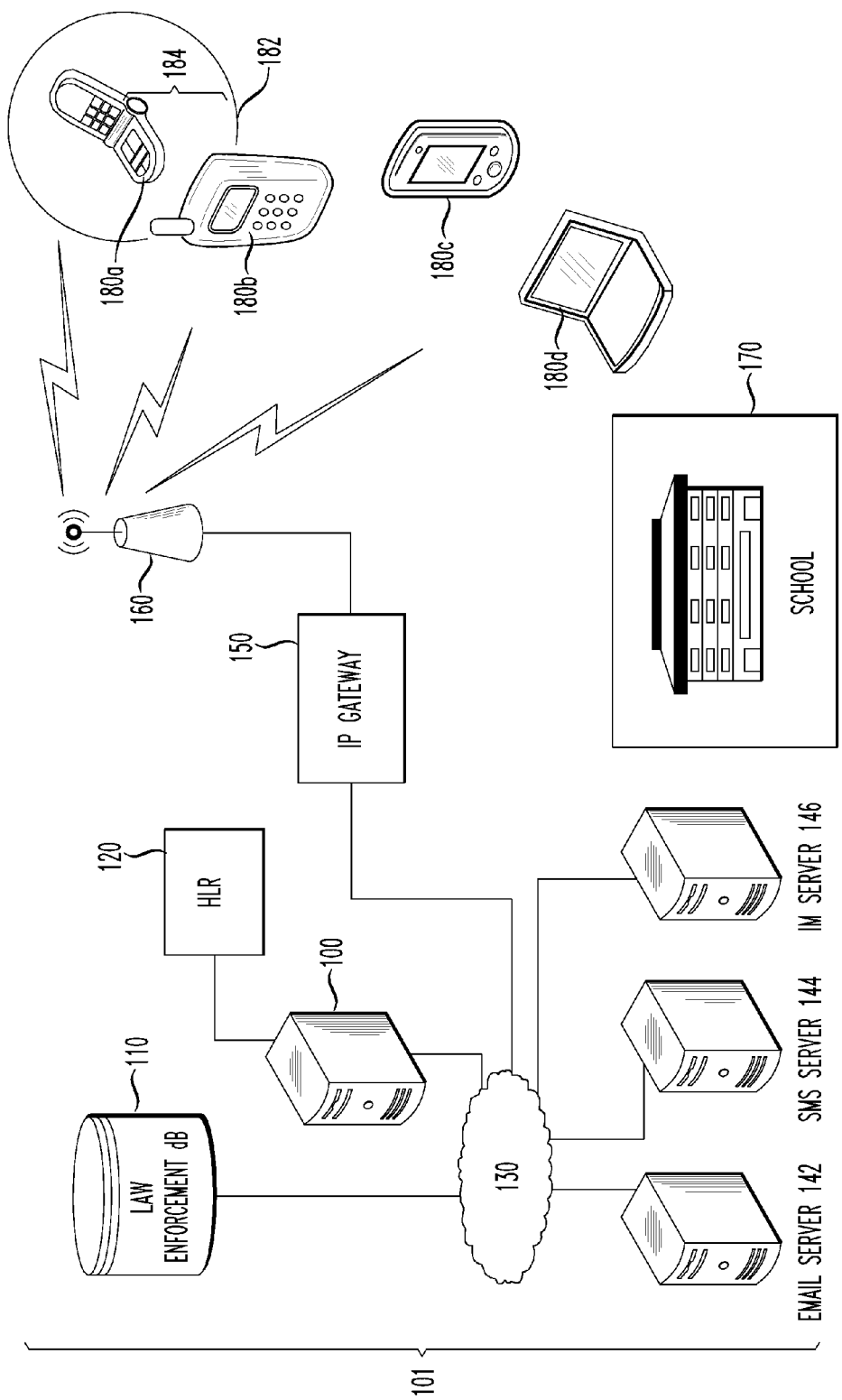
FIG. 1 shows a location based proximity alert system, in accordance with the principles of the present invention.

With respect to law enforcement, a restraining order is a protection device whereby a Court establishes it to be unsafe for two individuals to have contact. Each state in the United States has some form of domestic "stay away" law.

The present invention applies location enabled cell or other wireless equipment to a long-felt but unsolved need in today's society. Namely, in accordance with the principles disclosed herein a proximity alert server monitors for violations of such a restraining order.

In an alternate embodiment, in an everyday case a subscriber might just want to get a notification when another subscriber is in their vicinity. The Subscriber Proximity notification disclosed herein is a system that notifies a subscriber via SMS, or any other messaging system, when another subscriber is using the same or geographically close cell equipment.

The present invention is a service whereby a given subscriber, e.g., subscriber 1, provisions their phone number (or other unique identifying number) of another subscriber (e.g., subscriber 2) and a range, radius or other proximity defining value. Examples of the radius or other proximity defining value might be within 100 yards, within 1 mile, etc. In this example, subscriber 1 receives notification when subscriber 2 gets within a pre-set range, radius or other proximity defining distance of subscriber 1.

The present invention has particular applicability for use when a court ordered restraining order is imposed, and preferably includes a time frame for enforcement of a subject restraining order. For instance, if a given restraining order is valid for 30 days, the geo-proximity alert service in accordance with the present invention preferably automatically expires after 30 days or other appropriate time.

In one given application, each time subscriber 1 registers call-routing information in the appropriate Home Location Register (HLR), the system uses the pre-set proximity defining value to create a proximity-list of cell equipment that is within the perimeter. This system then preferably compares the registered call-routing information for subscriber 2 with the proximity-list. If the subscriber 2 registered call-routing is in the proximity-list, the system then sends an appropriate geo-proximity alert message (e.g., SMS, IM, etc.) to subscriber 1, a law enforcement facility, and/or a public safety access point (PSAP), etc., alerting them to the situation.

This invention has particular relevance and use with a cell phone or personal digital assistant (PDA). In addition to the important law enforcement aspects of the invention, it is also applicable to social networking applications, e.g., if two consenting parties want to know when they are within proximity to one another, or simply in a same general area.

The present invention can also be used to provide information regarding entry of a user's wireless device within an unauthorized proximity to certain types of locations, e.g., schools, a park, playgrounds, and/or other places where children gather, etc. The proximity message may be sent to an appropriate person, e.g., police personnel, along with identifying information sufficient for the police personnel to respond to the situation.

With appropriate sensitivity to privacy issues addressed, the present invention has applicability in non-law enforcement scenarios as well as the law enforcement embodiments disclosed herein.

FIG. 1 shows a location based proximity alert system, in accordance with the principles of the present invention.

In particular, the location based proximity alert (LBPA) system 101 disclosed herein, includes a location based proximity alert (LBPA) server 100, a law enforcement database 110, a home location register (HLR) 120, a communication network 130, various messaging servers 142-146, a gateway 150, and a cellular tower 160. The location based proximity alert (LBPA) system 101 disclosed herein can further include various wireless clients (WCs), such as in particular a cellular telephone 180a, a smart phone 180b, a personal data assistant 180c, and a laptop computer 180d (collectively and individually described herein as wireless client(s) 180).

The location based proximity alert server 100 provides the backbone for location monitoring and message alerting functions disclosed herein. In particular, the location based proximity alert server 100 accesses law enforcement database 110 for parameters with which to base wireless client 180 monitoring, as well as limitations that dictate when a message is to be issued to pre-configured recipients, e.g., in the event of a restraining order violation.

The location based proximity alert server 100 accesses a location service, such as home location register 120. Each time a wireless client 180 registers call-routing information in the home location register 120, the location based proximity alert server 100 can use a pre-set proximity value retrieved from an appropriate law enforcement database 110 to create a proximity-list of wireless clients 180, as defined in the law enforcement database 110. This location based proximity alert system 101 then preferably compares the registered call-routing information for the wireless client 180a with the proximity-list of wireless clients 180. If the registered wireless client's 180 call-routing is in the proximity-list, the location based proximity alert server 100 then sends an appropriate geo-proximity alert message (e.g., SMS, IM, etc.) to the preconfigured point, e.g., wireless client 180a alerting them of the situation, e.g., a restraining order violation.

A digital communication network 130 allows the location based proximity alert server 100 to send an appropriate geo-proximity alert message. The digital communication network 130 is preferably an open IP based communication network, such as the Internet. Alternately, the digital communication network 130 is a closed IP based communication network, relying on locally assigned IP addresses. Irrespective of the type of communication network used, the location based proximity alert server 100 communicates with any of a variety of messaging servers, such as e-mail server 142, Short Message Service (SMS) server 144, Instant Message (IM) server 146, etc. through IP packet addressing, as is otherwise known within the art.

An IP gateway 150 provides gateway functions to allow the communication network 130 to send and receive digital data packets to and from a cellular network 160. The cellular network 160 transmits an appropriate geo-proximity alert message from any of e-mail server 142, Short Message Service (SMS) server 144, Instant Message (IM) server 146, etc., to a pre-designated wireless client 180 over the communication network 130.

For example purposes only, the wireless client 180a is shown as having an entry in the law enforcement database 110. However, any number of wireless clients 180 can have simultaneous entries in the restraining order database 110. The wireless client 180a is shown as having an entry in the law enforcement database 110 that corresponds to the radius distance 184.

The radius distance 184 can be a distance measured in any unit of measurement that allows for a determination of a restraining order violation. The radius distance 184 from the wireless client 180a produces a zone of protection 182 around the relevant wireless client 180a.

If the location based proximity alert server 100 determines that a location of the relevant wireless client 180b, as identified in the home location register 130, is within radius distance 184, or if the location based proximity alert server 100 identifies the same wireless client 180b as having restricted status in the law enforcement database 110 for that particular wireless client 180a, the location based proximity alert server 100 triggers transmission of an appropriate geo-proximity alert message. As shown in more detail in FIG. 2, the specific type of geo-proximity alert message can be specified as an entry in the law enforcement database 110.

The radius distance 184 is described above as being a protective zone 182 that when breached, e.g., by the wireless client 180b, triggers an appropriate geo-proximity alert message. However, in an alternate embodiment, radius distance 184 can be a restrictive zone that when breached by a geographically stationary point, causes triggering of an appropriate geo-proximity alert message. In this type of embodiment, if the wireless client 180a is the subject of a restraining order that prevents its holder from getting within a configured distance 184 of any school grounds 170, a breach of any of the geographic points associated with school grounds 170 within a given distance 184 results in an appropriate geo-proximity alert message being transmitted to the proper authority(ies). The proper authorities can be preconfigured as an entry in the law enforcement database 110, as shown in more detail in FIG. 2.

The law enforcement database 110 preferably is a highly secure database that requires encrypted and password protected access. Law enforcement personnel are preferably provided remote access to the law enforcement database 110 through a secure digital connection. A web page can be used to populate the entries within the law enforcement database 110, as well as to review and correct entries within the law enforcement database 110.

Although the location based proximity alert server 100 relies on access to a home location register (HLR) to monitor the location of wireless clients 180, any of a number of location services can be employed to determine the location of a given wireless client 180. For instance, the Global Positioning System (GPS) is becoming commonly integrated within wireless clients 180, and if available can be used to directly provide location information for the relevant wireless client 180 to the location based proximity alert server 100. Alternately, within the principles disclosed herein, cellular triangulation, signal strength monitoring, etc. may alternatively be used to provide location information for a wireless client 180 to the location based proximity alert server 100.

Figure 2:
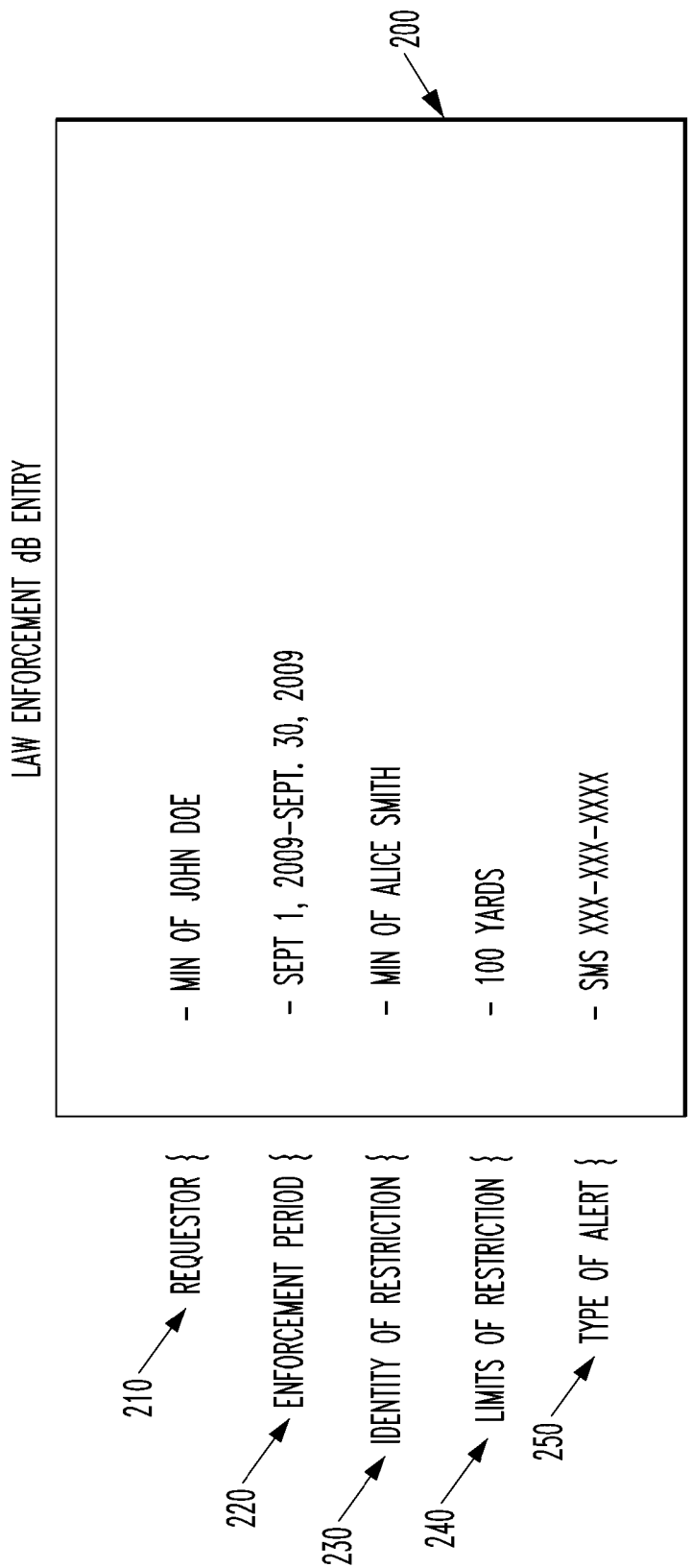
FIG. 2 shows an example entry in the law enforcement database shown in FIG. 1, in accordance with the principles of the present invention.

FIG. 2 shows an example entry 200 in the law enforcement database 110 shown in FIG. 1, in accordance with the principles of the present invention.

In particular, entry 200 can include a requestor field 210, an enforcement period field 220, an identity of restriction field 230, a limits of restriction field 240, and a type of alert field 250.

The example requestor field 210 is shown as being "MIN of John Doe", MIN being a mobile identification number (MIN). However, the requestor field 210 could include a state, a county, a country, etc. that issued a restraining order.

The example enforcement period field 220 is shown as being "Sep. 1, 2009-Sep. 30, 2009". However, the enforcement period field 220 could include specific times of a day, specific days of the week, specific months of the year, and even years of enforcement, all in accordance within the principles disclosed herein.

The example identity of the restriction field 230 is shown as being "MIN of Alice Smith". However, in accordance with the principles disclosed herein, the identity of the restriction field 230 could include telephone numbers, specific longitude(s) and latitude(s), ranges of longitudes and latitudes, names of geographic places that can be cross-referenced to their geographic locations, etc.

The limits of restriction field 240 is shown in the exemplary embodiments as being "100 yards". However, in accordance with the principles disclosed herein, the limits of the restriction field 240 could be a zero value requiring direct contact with the identity of the value associated with the identity of the restriction field 230, a measurement in miles, a city limits value, a state value, etc.

The type of alert field 250 is shown in the exemplary embodiments as being "SMS XXX-XXX-XXXX". However, in accordance with the principles disclosed herein, the type of alert field 250 can designate e-mail and an e-mail address, can designate IM and an IM address, can designate the police, can designate a relative of the restraining order requestor, can designate any desired telephone number to call, etc. Preferably, if the location based proximity alert server 100 dials a telephone number to provide a location based proximity alert relating to a violation of a restraining order, a pre-recorded message may be played, and a further option may be provided to connect with a public access safety point (PSAP), police station, etc., to avoid delay in responding to the restraining order violation. Likewise, if the location based proximity alert server 100 transmits a text message to provide a location based proximity alert relating to violation of a restraining order, information useful to police or other authorities is preferably provided with the text message.

Alternately, within the scope of the principles disclosed herein, the type of alert field 250 could designate a list of services to contact in the event that a given restraining order is being violated, with contact to authorities such as police, a private security company, etc. The location based proximity alert server 100 can use the designated list of services to trigger transmission of a plurality of geo-proximity alert messages in response to a single restraining order violation. The type of alert field 250 can even include a mobile identification number (MIN) to assist in reaching a wireless client 180 in the event an alternate designated method fails to reach the wireless client 180.

Figure 3:
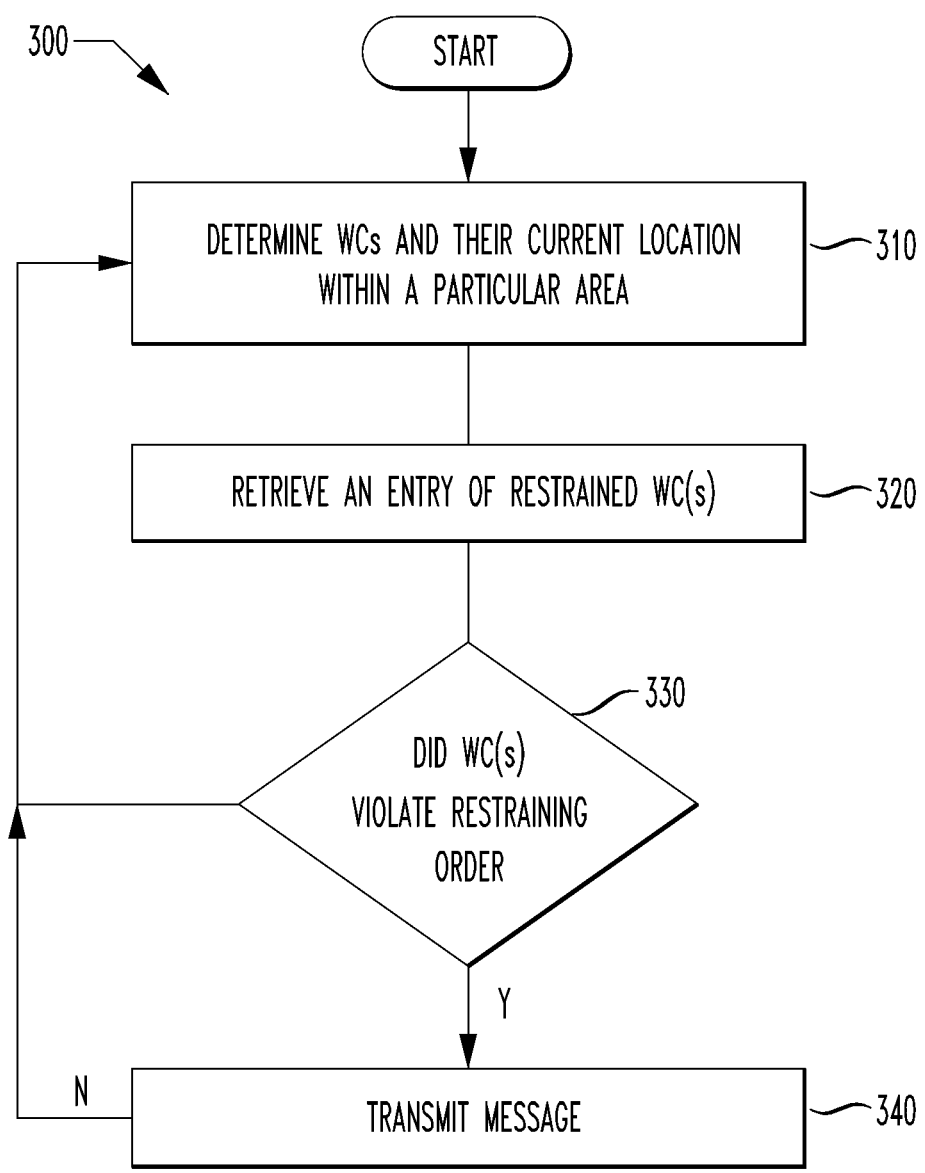
FIG. 3 shows an exemplary flow chart for a process of triggering a geo-proximity alert message, in accordance with the principles of the present invention.

FIG. 3 shows an exemplary flow chart for a process of triggering a geo-proximity alert message 300, in accordance with the principles of the present invention.

In particular, as shown in step 310 of FIG. 3, a determination is made of which wireless client(s) 180 exist within in a particular area. The location based proximity alert server 100 can access a home location register 120 to retrieve a list of wireless clients 180 and their respective locations that have registered call-routing information in the home location register 120.

In step 320, a determination is made if any of the wireless clients 180 that were determined to be within a particular area in step 310 are subject to a restraining order. The location based proximity alert server 100 can use the list of wireless clients 180, e.g., MINs, that were determined to be within a particular area in step 310 as a database query issued to law enforcement database 110. Any matched wireless clients 180 returned from the database query provides a list of wireless clients 180 that are subject to a restraining order and their respective restrictions.

In step 330, a decision is made if the wireless client 180 that is subject to a restraining order is in violation of its respective restrictions. The location based proximity alert server 100 compares the geographic location of the wireless client 180 (e.g., wireless phone) that is subject to a restraining order, to the geographic location of the identity of the restriction, as retrieved from law enforcement database 110. The identity of the restriction can be, e.g., proximity to another wireless client WC 180 (such as a wireless phone carried by an ex-girlfriend), or within geographic boundary coordinates corresponding to a restricted perimeter around an area where children would be, e.g., a school, a playground, a daycare center, etc.

If the result of the decision from step 330 is that a restraining order violation has occurred, step 330 branches to step 340. Otherwise, step 330 branches back to step 310 to continuously monitor for a restraining order violation.

In step 340, an appropriate geo-proximity alert message is generated and transmitted (e.g., via SMS, IM, etc.) to whatever alert destination that is pre-configured by specification in the type of alert field 250 in the restraining database entry 200. The location based proximity alert server 100 initiates transmission of an appropriate geo-proximity alert message to the pre-configured alert destination that is associated with the wireless client 180 that was determined to have violated its restraining order in step 330.

Step 340 branches back to the beginning of the, process of triggering a geo-proximity alert message 300 to allow for continuous monitoring of restraining order violations, in accordance with the principles disclosed herein.

Although the embodiments described herein provide for a location based proximity alert based on movement of a wireless client (e.g., a wireless phone) carried by an offender subject to a restraining order, the principles disclosed herein can be applied to alert a subscriber of a wireless client 180 of proximity to another wireless client 180 and/or proximity to a specific geographic location. The identity of other wireless clients 180 and/or specific geographic locations can be stored in a database entry, e.g., in an entry in the law enforcement database shown in FIG. 2. In this manner, law enforcement or even another subscriber can be alerted when they come within a preconfigured radius distance 184 of a select wireless client carried by, e.g., a friend or family member.

While the invention has been described with reference to the exemplary embodiments thereof, those skilled in the art will be able to make various modifications to the described embodiments of the invention without departing from the true spirit and scope of the invention.

What is claimed is:

1. A method of providing location-based proximity alert services, comprising:

retrieving, by a location-based proximity alert physical server, a current location of a wireless client device, said current location being based on call-routing information associated with said wireless client device, said call-routing information being registered in a location device servicing said wireless client device device, and said wireless client device associated with a given restraining order target identifier from a plurality of restraining order target identifiers;

accessing a law enforcement database comprising said plurality of restraining order target identifiers, each associated with a corresponding restraining order limit identifier, to obtain a relevant restraining order limit identifier associated with said given restraining order target identifier; and generating a geo-proximity alert message when said current location is within a prohibited geographic area associated with said given restraining order target identifier.

2. The method of providing location-based proximity alert services according to claim 1, wherein:

said given restraining order target identifier is a mobile identification number (MIN).

3. The method of providing location-based proximity alert services according to claim 1, wherein:

said given restraining order target identifier is a mobile telephone number.

4. The method of providing location-based proximity alert services according to claim 1, further comprising:

determining a distance between said wireless client device associated with said given restraining order target identifier, and a wireless client device requesting said geo-proximity alert message.

5. The method of providing location-based proximity alert services according to claim 1, wherein:

said prohibited geographic area associated with said given restraining order target identifier is a prohibited perimeter around a given school.

6. The method of providing location-based proximity alert services according to claim 1, wherein:

said prohibited geographic area associated with said given restraining order target identifier is a prohibited perimeter around a given park.

7. The method of providing location-based proximity alert services according to claim 1, wherein:

said geo-proximity alert message is an email message.

8. A location-based proximity alert physical server, comprising:

a law enforcement database access module to access a physical law enforcement database comprising a plurality of restraining order target identifiers each associated with a given restraining order limit identifier;

a location access module, at said location-based proximity alert physical server, to retrieve a current location of a wireless client device, said current location being based on call-routing information associated with said wireless client device, said call-routing information being registered in a location device servicing said wireless client device, and said wireless client device associated with a given restraining order target identifier from said plurality of restraining order target identifiers; and a restraining order violation module to generate a geo-proximity alert message when said current location for a restraining order target enters a prohibited geographic area associated with said given restraining order limit identifier.

9. The location-based proximity alert physical server according to claim 8, wherein:

said given restraining order target identifier is a mobile identification number (MIN).

10. The location-based proximity alert physical server according to claim 8, wherein:

said restraining order violation module generates said geo-proximity alert message when said wireless client device associated with said restraining order target is less than a preconfigured minimum distance from another wireless client device requesting said geo-proximity alert message.

11. The location-based proximity alert physical server according to claim 8, wherein:

said prohibited geographic area associated with said given restraining order target identifier is a prohibited perimeter around a given school.

12. The location-based proximity alert physical server according to claim 8, wherein:

said prohibited geographic area associated with said given restraining order target identifier is a prohibited perimeter around a given park.

13. The location-based proximity alert physical server according to claim 8, wherein:

said geo-proximity alert message is an email message.

* * * * *